United States Patent

Andrews et al.

[15] 3,699,573
[45] Oct. 17, 1972

[54] SYSTEM FOR AUTOMATIC INITIATION OF TARGET TRACKING IN TRACK-WHILE-SCAN RADAR

[72] Inventors: La Vern A. Andrews, Fullerton; Donald A. Muchlinski, La Habra, both of Calif.

[73] Assignee: Hughes Aircraft Company, Culver City, Calif.

[22] Filed: May 5, 1966

[21] Appl. No.: 548,822

[52] U.S. Cl.....................................343/7.3, 343/7 A
[51] Int. Cl.................................................G01s 9/14
[58] Field of Search...........................343/7, 7.3, 7 A

[56] References Cited

UNITED STATES PATENTS

3,460,137   8/1969   Ralston...................343/7 A X

Primary Examiner—T. H. Tubbesing
Attorney—James K. Haskell and Walter J. Adam

[57] ABSTRACT

A track-while-scan radar system that initiates tracking of a target on the basis of previous position information or plots stored in the main memory of a computer. If a new plot correlates with the updated position of one of the targets, a new updated target position is stored in the main memory, and if the plot does not correlate, it is stored in a temporary memory for subsequent correlation. If the new plot correlates with the plots in the temporary memory, the plots are transferred to the computer main memory. Any plots in the temporary memory which do not correlate during a selected number of succeeding scans are cleared from that memory as they are assumed to be spurious plots.

10 Claims, 5 Drawing Figures

Prior Art

Fig. 1.

LaVern A. Andrews,
Donald A. Muchlinski,
INVENTORS.
BY.
J. K. Haskell
ATTORNEY.

LaVern A. Andrews,
Donald A. Muchlinski,
INVENTORS.

SYSTEM FOR AUTOMATIC INITIATION OF TARGET TRACKING IN TRACK-WHILE-SCAN RADAR

This invention relates to radar data processing circuitry and more particularly to an improved system in track-while-scan radar.

The great advances made in the computer or data processing art have led to the development of track-while-scan radar systems. In such a system, similar to conventional radar, video signals, received from targets in response to transmitted radar pulses, are used to derive position information for each target and display it before an operator on a display console. One form of target information display is plan position indication often referred to as PPI display in which a target is displayed as a mark with the distance of the mark from a center point and the angle therebetween and a reference line representing the target's range and azimuth respectively. In addition to such conventional arrangements, in a track-while-scan radar system a relatively large capacity computer is included to track each operator selected target as it is scanned by a radar antenna which gathers the video signals therefrom. Briefly, after a decision is made by a console operator to track a target, its position at a given scan is stored in the computer's memory. The target's position is then successively updated during succeeding scans in which video signals from the target are received. Thus, tracking is accomplished by the continuous updating of the target's information, as long as unique and uncontaminated (discreet) video signals are received the target from which the updated target position may be derived.

In prior art track-while-scan radar systems, even though the actual updating of the target's position is automatically performed by the computer, the decision to track a given target is manually performed by an operator observing a target position display console. The function of the operator is to observe the position of each displayed target and on the basis of pre-established criteria, such as target position changes as well as changes in target velocity, determine which of the targets are of sufficient interest to be tracked. Once deciding to track a target the operator communicates with the computer by well-known man-machine communication techniques to initiate the automatic tracking. This initiation process may require from three to five scans of time per target after initiation entry of target into detectable radar surveillance volume for a single target. For multiple targets simultaneously entering the radar volume the time element is increased.

Although such systems operate with varying degrees of success, their effectiveness is limited because an operator must observe and decide which target or targets to track and then monitor their updated position, the number of targets which an operator can handle being is limited. Therefore a prior art track-while-scan system, designed to track a large number of targets requires many operators and consoles which greatly increase the original and operative cost of the system. Also, since the decision to track a target is made by the operator, it is subject to human errors which increase with operator fatigue, thereby reducing the system's overall tracking accuracy and the target's mean system track life. In addition, the system's response time to establish a track on a target is quite significant depending on the number of targets that arrive nearly simultaneously at the radar detector range limit.

It is therefore an object of the present invention to provide a new and improved track-while-scan radar system employing automatic initiation techniques.

Another object is the provision of a track-while-scan radar system with improved accuracy of track data and system mean track life.

A further object is to provide an improved track-while-scan radar system with a minimum response time to establish target tracking which is especially important for low attitude or pop-up targets which normally appear at short ranges from the radar site.

Another object is to provide a track-while-scan radar system which does not require an operator to initiate target tracking.

Another object of the automatic initiation arrangement is to eliminate initial spurious plots caused by noise and clutter in the video processor from saturating the computer track store.

Still a further object is to provide a system in which the initiation of target tracking is automatically determined thereby minimizing the system's limitation due to an operator's decision making.

Yet a further object is the provision of a track-while-scan radar system in which the operator's function is of a monitoring nature so that operator's fatigue is not a factor in the system's accuracy. This action will permit the operator to perform supervisory tasks rather than mundane and fatiguing target detection tasks over the entire radar surveillance area.

These and other objects are achieved by providing a track-while-scan radar system in which the decision to initiate tracking of a target is automatically performed, on the basis of previous automatic detected discreet position information, received and stored in the computer circuitry which forms a part of the system. Briefly, the system of the present invention includes, as in a prior art system, an automatic detector which converts video signals from each target into target position information such as a target's range and azimuth hereafter referred to as a plot. The system also comprises a tracking computer including a main memory and a plot or track correlator. The correlator associates each plot received from the automatic detector with updated target positions developed by the tracking computer and stored in the main memory. These updated target positions represent the predicted positions of the tracked targets at the particular point in time as computed by the tracking computer.

If the plot correlates with the updated position of one of the targets, it is used by the computer to generate a new updated target position which is stored in the main memory. On the other hand, if the received plot does not associate or correlate with any of the updated target's positions, thereby indicating that it is not a plot of one of the targets which are already tracked, it is compared within a track initiation gate with plots previously stored in a temporary memory. If the received plot is found not to associate with any of the plots in the temporary memory, it is stored in the temporary memory for correlation with plots received on subsequent scans.

If on the other hand the received plot correlates with one of the plots in the temporary memory, it is assumed that the received plot and the previously stored plot with which it has correlated are of a target moving in a predictable pattern which should be tracked. Consequently, the plots are transferred to the tracking computer wherein they are used to predict the position of the target on succeeding scans. Thus, the decision to initiate the tracking of a target is automatically derived.

In addition, any plots in the temporary memory which do not correlate with any of the plots received during a selected number of succeeding scans are automatically cleared from the temporary memory. The reason that they are cleared from memory is that since they did not correlate with the updated plots in the main memory thereby indicating that they are not plots from already tracked targets and since they did not correlate with plots in succeeding scans, indicating that they are not plots from new discreet targets to be tracked, they are assumed to represent spurious plots which do not merit tracking. Scan to scan correlation technique is a powerful method to reduce false targets detected by the automatic detection or video processor device.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
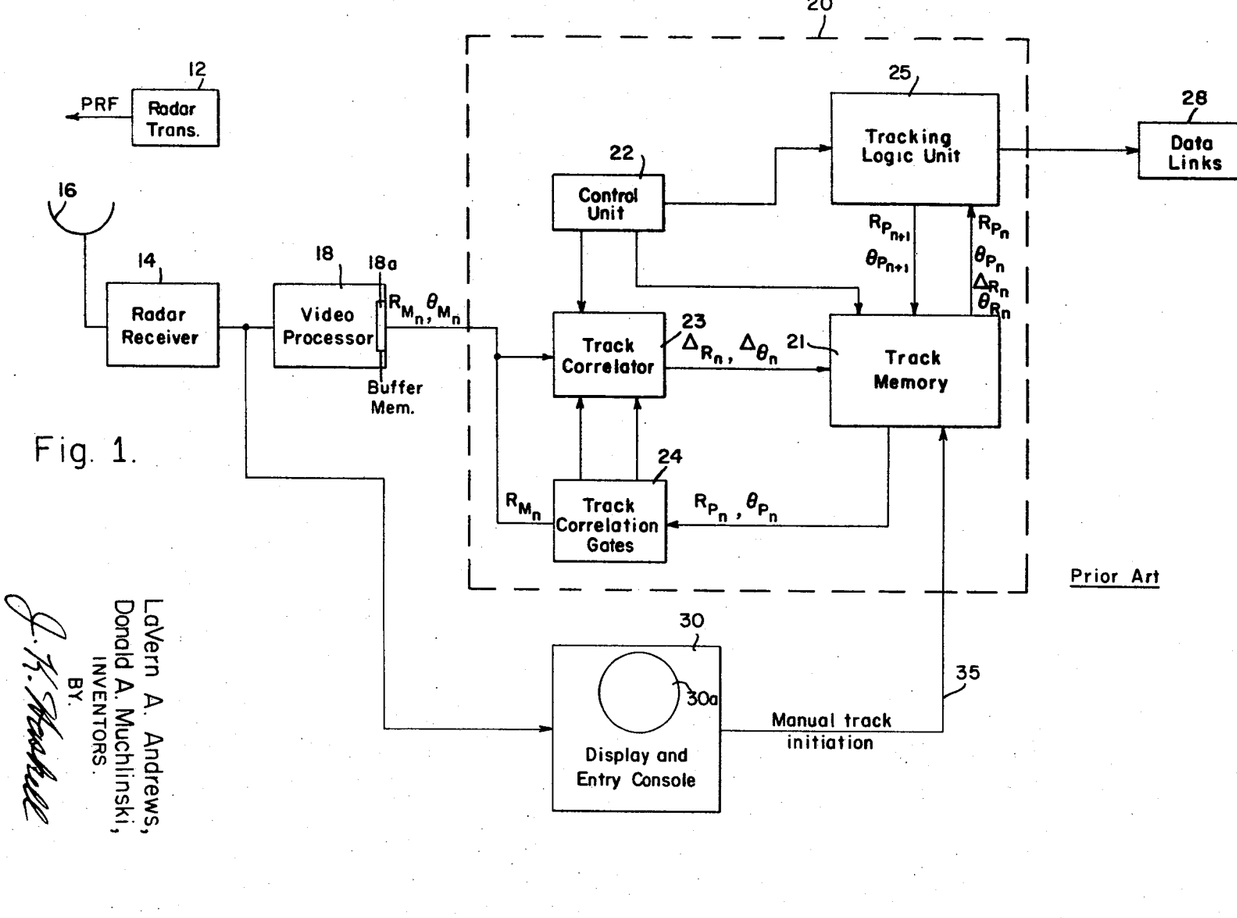
FIG. 1 is a block diagram useful in explaining the prior art.

Reference is now made to FIG. 1 of the drawings which is a simplified block diagram of a prior art track-while-scan system, used to explain the general principles of operation of the track-while-scan system, as well as the limitations of the prior art. Therein, a radar transmitter 12 is assumed to transmit radar pulses at a selected pulse repetition frequency (PRF). A radar receiver 14 is assumed to generate noise and receive signals from a scanning antenna 16, which responds to energy or echoes reflected therefrom from objects, such as targets or moving and stationary clutter as a result of the transmitted radar pulses thereto. As is appreciated by those familiar with the art, the received signals, often referred to as video signals, are processable in a video processor 18 which provides outputs, output messages or words representing target or random clutter position information, indicative of the locations of the energy-reflecting objects and of locations of noise that correlate as a result of the processing sweep to sweep integration process. As is well known in the art, the processor 18 may include a buffer memory 18a for storing a plurality of the target messages or words. This information may be in the form of signals representing X and Y coordinate values or in the form of range R and azimuth $\theta$ with respect to a reference point, such as the receiver location and a reference azimuth $\theta_o$, respectively. Hereafter, for explanatory purposes only, it will be assumed that the target position information, also referred to hereafter as a plot, is represented by range (R) and azimuth $\theta$ signals.

In the track-while-scan system shown in FIG. 1, the outputs or plots from processor 18 are shown supplied to a track-while-scan data processor, generally designated by numeral 20. The data processor is shown to include a track memory 21, a control unit 22 and a track correlator 23, associated with track correlation gates 24. Briefly described, the function of the data processor 20 is to track one or more operator selected targets by means of a tracking logic unit 25 which automatically updates the position of each target correlated by the track correlator 23. The target position information for each target in the memory 21 is generally referred to as a track, while position information received from processor 18 before being correlated to any one of the tracked targets is referred to as a plot. Each plot or track generally comprises range R and azimuth $\theta$ signals.

When a plot is received at a given time and it is found to correlate with signals or one of the tracks stored in memory 21, based upon the correlation gate size developed by the predictor position data representing the predicted position for one of the targets at that particular point in time, the plot data, as well as the stored track data are used to update the target's position and to predict its position on the next scan. Briefly, when correlation is present, the correlator 23 may provide range and azimuth or $\Delta X$ or $\Delta Y$ difference signals which represent the differences between the corresponding signals of the plot and the predicted track coordinates with which it correlates. These difference signals, hereafter designated $\Delta R$ and $\Delta \theta$, are then stored in the memory 21, for subsequent use together with the correlated track by the logic unit to provide an updated target position and for future target prediction purposes.

Since the initial development of track-while-scan radar, various techniques have been developed to optimize the accuracy with which targets can be tracked. Several of these techniques and other such matter related thereto have been described in various publications, known by those familiar with the art. One example of a prior art publication is an article entitled "Optimizing the Dynamic Parameters of a Track-While-Scan System," by Jack S. Klansky, published in the RCA Review, Vol. 18, June, 1957. Another publication related to track-while-scan radar is an article entitled "Synthesis of an Optimal Set of Radar Track-While-Scan Smoothing Equations," by T. R. Benedict and G. W. Bordner, published in the IRE Transactions on Automatic Control, 1962. Several technical papers related to track-while-scan radar were presented at a tracking symposium sponsored by the Mitre Corporation, and were published in the Proceedings of the Mitre Tracking Symposium, Sept. 29, 1959. One of the papers published therein is entitled "A Picture of Track-While-Scan Smoothing," by N. P. Nelson in which the use and function of velocity and position smoothing parameters, hereafter designated by $\beta$ and $\alpha$ respectively are described.

In such a prior art system, even though the actual tracking of the selected targets is automatically accomplished by means of the data processor 20, the initial determination to track a target is made by an operator viewing a display and entry console 30. Such a console includes a display device, such as a cathode ray tube with a display surface on which the relative positions of the various objects providing video signals are displayed. Conventionally the output of receiver 14, representing such video signals is supplied to the console 30. Therein the signals are used to energize the display device so as to display thereon each object providing video signals. One display form, known as plan position indication (PPI) is diagrammed in FIG. 2, which represents an enlarged front view of a display surface 30a. Therein the position of one object is represented by a mark X. The distance between the mark X and the display surface center 0 represents range and its relative position with respect to a reference azimuth $\theta_o$ represents the azimuth of the target.

Figure 2:
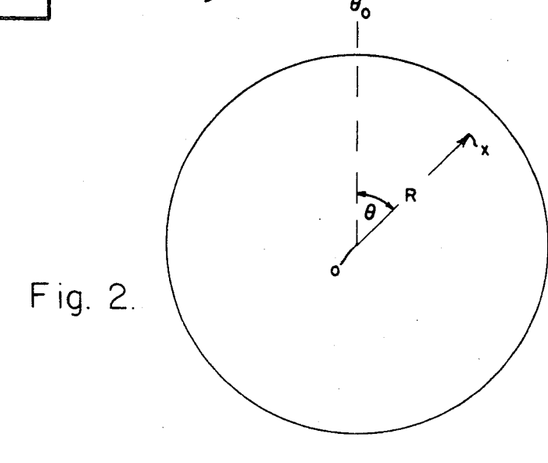
FIG. 2 is a front view of a PPI display surface.

It is appreciated that each scanned object providing video signals produces another mark on the display surface. The operator viewing the display surface and noticing the changes in the positions of the various marks determines which of the marks represent moving targets which are of sufficient interest to be tracked. Then when reaching the decision that a given mark represents a target of interest, the operator communicates with the computer, by any one of well known man-machine communication techniques, to initiate the tracking of the target. The communication is represented in FIG. 1 by line 35 interconnecting console 30 and the data processor 20. Essentially, it involves the entry of the selected target's current position and/or velocity into the data processor and establishes the area in which the track correlator will look for plots to associate with the entered track on the next antenna scan period.

In response to the operator's communication, the data processor stores the initial operator plot of the particular target in the memory 21. Thereafter, this plot is used as the data with which succeeding plots from processor 18 are correlated in track correlator 23 to sense whether such plots are from the particular target tracked so as to update the position thereof. As herebefore indicated, the need to rely on an operator to select or initiate the tracking of targets is most disadvantageous, in that an operator is limited to the number of targets which he can observe, monitor, and make a decision on which should be automatically or manually tracked. Also if the number of targets to be tracked and monitored is quite large, several operators are needed, each one requiring a separate display and entry console 30, thereby greatly increasing the cost and complexity of the track-while-scan system.

The process of performing surveillance and initiating of targets to be tracked is very fatiguing task and time consuming. It has also been established that surveillance performed by operators in areas that have long periods of inactivity result in poor response time of the operator and hence it reduces the amount of early warning provided. Thus, the problems associated with manual initiation are (1) time consuming, (2) fatiguing, (3) poor system response time, (4) accuracy, and 5) cost represent major deficiencies in that approach.

In accordance, however, with the teachings of the present invention, the initiation of the tracking of a target is automatically performed, so that the task of the operator in viewing the display surface 30a is limited only to monitoring and observing the changes in positions of the various targets that are tracked automatically. Thus, a single operator can monitor a large number of tracked targets. Since the number of targets that an operator can monitor is increased fewer display and entry consoles are required, thereby greatly reducing the cost, as well as the complexity of the track-while-scan system without effecting its capacity of tracking or the accuracy thereof. In one actual reduction to practice target handling capacity per operator was nearly doubled. Initial track position accuracy was increased several fold because of zero time delay. The system response time was improved 1-5 minutes depending on the number of targets that arrive nearly simultaneously at radar detection range limit. Also, operator console attendance period was increased because supervision function was less fatiguing than detection function.

Figure 3:
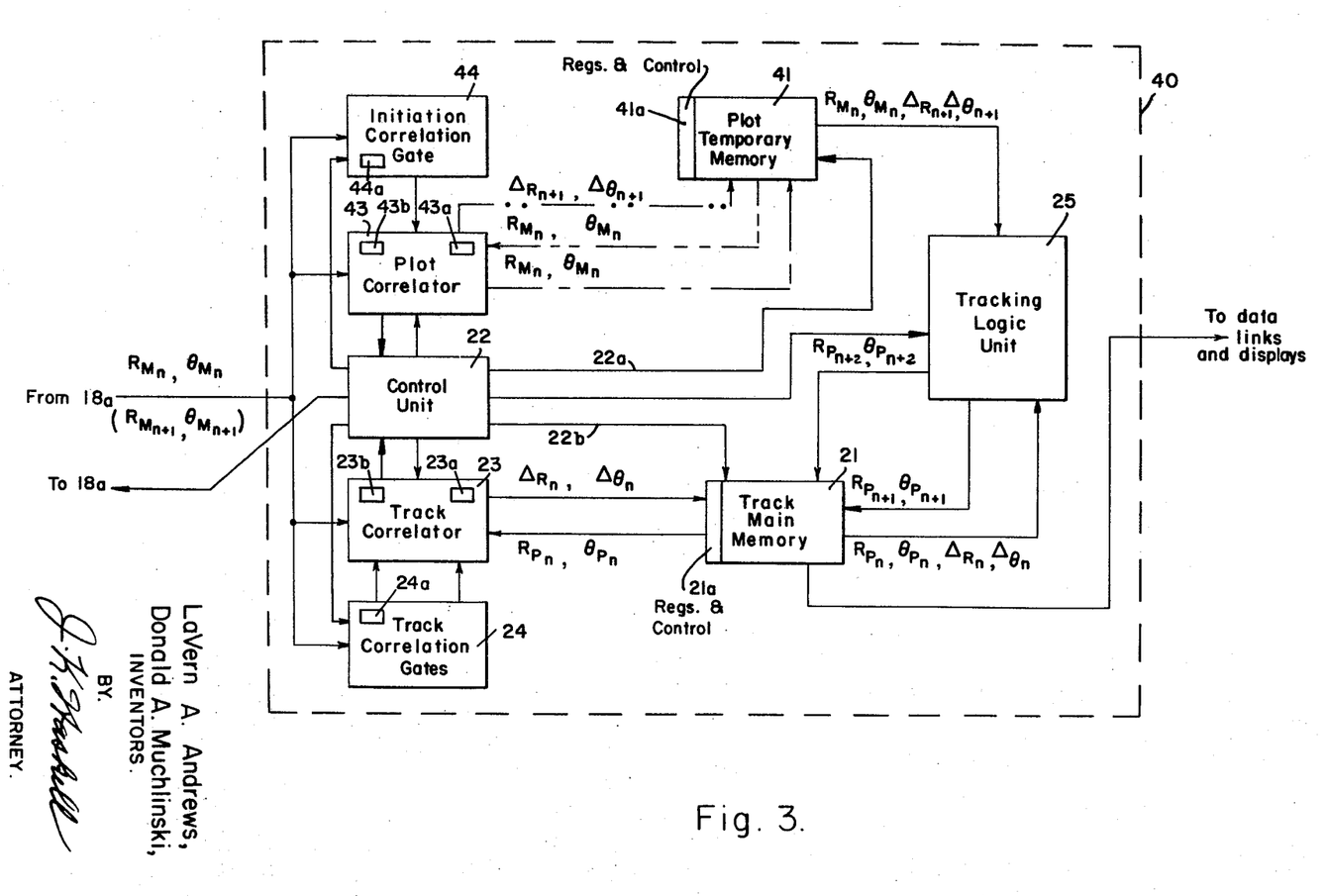
FIG. 3 is a block diagram of the novel system of the invention which replaces the dotted area shown in FIG. 1.

Reference is now made to FIG. 3 which is a partial block diagram of the novel track-while-scan system of the present invention. In accordance with the teachings of the present invention, the output of video processor 18 representing a target's position information or plot is supplied from the buffer memory 18a to a data processor 40, which is similar to data processor 20, hereinbefore described, in that it includes a computer memory 21, a control unit 22, a track correlator 23, track correlation gates 24 and logic unit 25. In addition, however, the data processor 40 includes a plot temporary memory 41, a plot correlator 43, and an initiation correlation gate 44, the function of which will be hereinafter described in detail. The control unit 22 is coupled to the buffer memory 18a, to a track correlator 23 and a plot correlator 43 for transferring control signals thereto and receiving signals therefrom, and to the correlator gates 24 and 44 for controlling the gate selection operation. The control unit 22 is also coupled to the memories 21 and 41 and through lines 22b and 22a to control the re-write of information into the memory during the normal rewrite cycles. Also, the logic unit 25 responds to the control unit 22. The memories 21 and 41 respectively include register and control logic units 21a and 41a, the correlation gates 24 and 44 respectively include gate selection logic units 24a and 44a, the correlator 23 includes a register 23a and a subtractor and logic unit 23b and the correlator 43 includes a register 43a and a subtractor and logic unit 43b.

In accordance with the teachings of the present invention, the data processor 40 operates in a manner similar to data processor 20 in that, upon receiving a plot (R,$\theta$) from processor 18 it correlates each of the tracks stored in the computer memory 21 with the plot in the correlator 23 to detect whether the newly received plot correlates with any of the tracks. If it does correlate, it indicates that the plot is from one of the tracked targets, and is used by the logic unit to update the position or track of the particular target in a manner similar to data processor 20.

In the prior art if a plot did not correlate with any of the tracks in the computer memory 21 it was discarded. However, in accordance with the teachings of the present invention, the plot after failing to correlate with any of the tracks in the memory 21 is transferred to the plot correlator 43 wherein it is correlated in accordance with criteria provided by gate 44, with any tracks which may be stored in the plot temporary memory 41. If the new plot does not correlate with any of the tracks in the temporary memory 41, it is transferred and temporarily stored in temporary memory 41 as a temporary plot. The reason for storing the plot in temporary memory 41 is based on the assumption that since the plot did not correlate with any of the tracks in the track main memory 21, thereby indicating that it is not from one of the targets already being tracked, it nevertheless may be a plot of a new target to be tracked. Thus, it is placed in temporary memory for future use to determine its possible relationship to a new plot to be received on the next scan period. Use of this temporary plot for immediate correlation purposes is prohibited by a time delay equal to a portion of the scan time, such as 1/2.

If, on the other hand, the new plot which is correlated in plot correlator 43 does correlate or associate with any one of the temporary tracks in memory 41, it indicates that the two are related to the same target. The effect of the positive correlation is to transfer the plot stored in the temporary memory and the difference signals provided by correlator 43 as a result of the positive correlation to unit 25 so that an initial position or track for the newly discovered target may be entered into the track main computer memory 21 for use or updating of succeeding plots received during succeeding scans.

From the foregoing it should thus be appreciated that every new plot is utilized, either for updating the positions or tracks or targets which are already being tracked or for possible initiation of the tracking of a new target. That is, the new plot is correlated with the temporary tracks in temporary member 41 to determine whether together with any of the data stored therein it represents a plot from a new target or whether it should be stored in memory 41 for use during a succeeding scan to determine its relationship to a trackable target. Any temporary track in the temporary memory 41 which does not correlate during a predetermined number of succeeding scans (usually 2 ½ scans) with any of the plots, is assumed not to be from any trackable target and therefore is automatically erased from the temporary memory. For improved system accuracy it is important that a new plot sequentially correlate, once in an initiation gate and twice in a tracking gate before it is accepted as a system track. Any misses in this sequence that occur for 2 ½ scans in succession automatically eliminate the track from further processing. This process of triple scan to scan correlation eliminates any noise or random clutter plots generated by video processor 18 from becoming a bona-fide system track.

The novel teachings of the present invention may further be explained in conjunction with a specific example. Let it be assumed that the new plot received from processor 18 comprises range and azimuth signals designated $R_{M_n}$ and $\theta_{M_n}$, where R and $\theta$ represent the range and azimuth signals, the subscript M indicates that these signals are actually measured signals, and the sub-subscript n represents a time n. Let it further be assumed, that one of the tracks stored in the track main memory 21 comprises signals $R_{P_n}$ and $\theta_{P_n}$, where subscript P represents a predicted position signal developed by the tracking logic based upon past correlation history. If the track from a memory correlates with the new plot in correlator 23 in accordance with any of the correlation criteria provided by gates 24, correlator 23 provides range and azimuth difference signals designated in FIG. 3 by $\Delta R_n$ and $\Delta \theta_n$, where the $\Delta R_n$ represents the difference between $R_{P_n}$ and $R_{M_n}$, and $\Delta \theta_n$ represents the difference between $\theta_{P_n}$ and $\theta_{M_n}$.

These signals are stored in the track main memory 21 in an address associated with the correlated track ($R_{P_n}$ and $\theta_{P_n}$). Then at some subsequent time when a logic unit 25 is available for arithmetic operations, the correlated track ($R_{P_n}$ and $\theta_{P_n}$) and the range and azimuth difference signals ($\Delta R_n$, $\Delta \theta_n$,) are supplied to it. These signals are then operated upon to provide system target updated signals which are supplied to the data links. In addition the logic unit 25 provides an updated track, represented by signals $R_{P_{n+1}}$ and $\theta_{P_{n+1}}$ which represent the predicted range and azimuth values of the particular target at a time n+1 (next scan's predicted position). This updated track is then stored in memory 21 for subsequent use at time n+1 with a new plot occurring in proper time and position sequence.

However, if none of the tracks stored in memory 21 correlate with the plot represented by $R_{M_n}$ and $\theta_{M_n}$, the control unit 22 energizes plot correlator 43 to correlate this new plot with any plots which may be stored in the plot temporary memory 41. The target message held in the buffer memory 18a is transferred to storage registers 23a and 43a in both the track correlator 23 and the plot correlator 43 at the start of a correlation cycle. If correlation occurs in the track correlator 23, then the lead 22b inhibits the memory recycle so that difference signals are written into the memory 21 which are utilized to form updated plots. When correlation is not obtained in track correlator 23, a signal is applied to control unit 22 which sends a signal to plot correlator 43 for performing a correlation. If a plot correlation is obtained, then an initiation signal is applied through control unit 22 to the memory 41 and to the tracking logic unit 25 to control transfer of the plot from the memory 41 to the main memory 21. It is to be noted that both memories 21 and 41 normally operate in a read-write or recycle mode with the information passing through the corresponding correlators. In response to the initiation, a signal is sent to the memory 21 from the unit 22 to control the writing of the word in an appropriate memory position. If the plot does not correlate in plot correlator 43, then a load new track signal is applied on line 22a to the memory 41 to cause that memory to store that uncorrelated track. In the system operation, a correlation cycle and an update cycle may alternately be provided with the track and plot correlation being provided during the correlation period and the updating, initiation and entering of new messages into the plot memory 41 during the update cycle. For the next correlation and update cycle, a new message is written into the registers 23a and 43a of the correlators 23 and 43 over the existing data to effectively erase the old message. The correlation in plot correlator 43 is in accordance with a specific correlation criteria provided by initiation correlation gate 44. If none of the plots in memory 41 correlate with the new plot ($R_{M_n}$ and $\theta_{M_n}$), or if the plot temporary memory 41 is empty, i.e., there are no plots stored therein, the plot correlator 43 supplies the new plot to the plot temporary memory 41 for temporary storage. This is represented by the line-dash-line connection between correlator 43 and memory 41 shown in FIG. 3.

Then, at a subsequent time when a new plot represented by $R_{M_{n+1}}$ and $\theta_{M_{n+1}}$ is received from processor 18 the correlation operation is repeated. Assuming that none of the tracks in the track main memory 21 correlate with this new plot, it is again correlated in plot correlator 43 with each of the temporary plots stored in memory 41, i.e., the previously stored plot therein represented by $R_{M_n}$ and $\theta_{M_n}$. The connection is designated in FIG. 3 by the line-dash-dash-line combination. Assuming that these plots correlate with one another, the plot correlator 43 provides range and azimuth difference signals represented by $\Delta R_{n+1}$ and $\Delta \theta_{n+1}$. $\Delta R_{n+1}$ represents the difference between $R_{M_n}$ and $R_{M_{n+1}}$, and $\Delta \theta_{n+1}$ represents the difference between $\theta_{M_n}$ and $\theta_{M_{n+1}}$. These difference signals are temporarily stored in the plot temporary memory 41, and at a later time, supplied to the logic unit 25 together with the initial plot stored in the temporary memory 41. Logic unit 25 operates on these signals to provide signals to the track main store or memory. These signals in a sense represent the first updated signals for the new target. Also, the logic unit 25 supplies to the track main memory 21 and initial track for the new target represented by signals $R_{P_{n+2}}$ and $\theta_{P_{n+2}}$ which represent the predicted range and azimuth signals of the new target at a subsequent time $n+2$.

In order to increase the accuracy with which tracks are automatically initiated it is desirable that before the updated signals are supplied to the data links and to the displays as a system track indicating a new target, they correlate with plots in succeeding scans. This is to insure that the new updated signals are from a real target. In one actual reduction to practice the updated signals had to correlate with plots during 2 succeeding scan intervals before they were supplied to the data links as a new target.

From the foregoing it should thus be appreciated, by those familiar with the art, that the last mentioned signals represent a new plot for a new target to be tracked. These signals are not generated by an operator communicating with the track-while-scan computer 40. Rather, they are automatically produced by the logic unit 25, in response to the signals stored and/or generated by the combination of the circuits comprising of the plot temporary memory 41, the plot correlator 43, and the initiation correlation gates 44. Thus, whereas, in the prior art arrangements, if a new plot did not correlate with any of the tracks in a main memory, the new plot was discarded, in accordance with the teachings of the present invention such a plot is utilized for correlation with subsequent new plots. And, when correlation is present between the two plots they are utilized to provide range and azimuth difference signals, which are then used with the first plot to generate an initial track for the new target. In accordance with the teachings of the present invention, if any of the temporary plots stored in plot temporary memory 41 do not correlate with any of the new plots during 2 ½ scan periods, thereby representing that it is not associated with any new target, it is automatically discarded from temporary memory 41. Similarly, if the first updated symbols $(R_{P_{n+2}}, \theta_{P_{n+2}})$ do not correlate with plots during two succeeding scan intervals they are discarded one-half a scan period later.

Plot correlator 43 operates in a manner similar to track correlator 23 in that it provides the range and azimuth difference signals when the two plots supplied thereto correlate, in accordance with the correlation criteria, provided by the initiation correlation gate 44. The latter gate operates in a manner similar to each of the track correlation gates 24 in that it provides a level for comparing the range and azimuth signals supplied to the correlator 43 and enables the correlator to provide the difference signals when the signals compared therein are within predetermined values.

Figure 4:
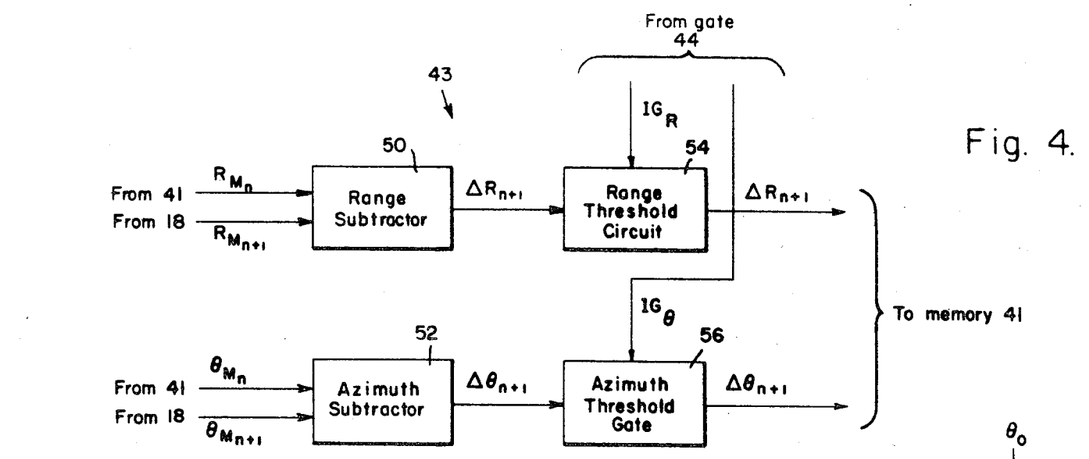
FIG. 4 is a block diagram of a correlator shown in FIG. 3.

The operation of plot correlator 43 may better be explained in conjunction with FIG. 4 to which reference is made herein. As shown, the correlator comprises two subtractors 50 and 52 which may be responsive to the contents of the message storage register 43a as explained relative to FIG. 3. Subtractor 50, designated as the range subtractor is responsive to the range signal $R_{M_{n+1}}$ of the new plot at time $n+1$ and the range signal $R_{M_n}$ of the temporary plot from memory 41, to provide a range difference signal $\Delta R_{n+l}$, which is supplied to a range threshold circuit 54. The latter circuit is also provided with a signal $IG_R$ from the initiation and correlation gate 44. The latter signal representing the range correlation criteria in accordance with which the range signals are to be correlated. Only when $\Delta R_{n+1}$ is not greater than $IG_R$ does circuit 54 provide an output equal to its input, i.e., $\Delta R_{n+1}$. The signal $IG_R$ is generated in the initiation correlation gate, as a function of the allowable range rms error of the system and the maximum velocity of targets expected to be tracked. In one actual reduction to practice $IG_R$ was made equal to $\pm 3\sigma_R + V_{max} \cdot \Delta t$, where $\sigma_R$ was the range rms system error, $V_{max}$ was the maximum expected velocity of any target to be tracked and $\Delta t$ was the time between correlated plots. With a blip to scan ratio of 1, $\Delta t$ is equal to the scan time. It was found that multiplying $\sigma_R$ by a constant of 3 provided a high degree of tracking reliability, (three sigma error point).

Referring again to FIG. 4 it is thus seen that the range difference signals such as $\Delta R_{n+1}$ is supplied to the memory 41 only when the difference between the two correlated range signals is not greater than the range signal from gate 44. Similarly, subtractor 52 compares the two azimuth signals such as $\theta_{M_n}$ and $\theta_{M_{n+1}}$ and provides an azimuth difference signal such as $\Delta \theta_{n+1}$ which is supplied to memory 41 through an azimuth threshold circuit 56 only when the azimuth difference signal is not greater than an azimuth correlation signal $IG_\theta$ supplied from the gate 44.

$$IG_\theta = 3\sigma_\theta + \frac{V_{max}}{R} \Delta t \frac{180}{\pi}$$

where $\sigma_\theta$ is the azimuth rms system error, R is the range of the particular new plot being correlated, and $180/\pi$ is a radian-degree conversion factor. The subtractors 50 and 52 and the threshold circuits 54 and 56 may be included in the subtractor and logic unit 43b.

From the foregoing, it is seen that the function of the initiation correlation gate 44 is to provide the range correlation signal $IG_R$ and the azimuth correlation signal $IG_\theta$ which have been defined in terms of the rms system error and other factors. It is appreciated by those familiar with the art that various circuit arrangements as well as special purpose arithmatic circuit may be employed to generate these two signals in accordance with the aforestated equations.

Referring again to FIG. 3, the track correlation gates 24 shown therein may comprise of one or more gates each providing a range correlation signal and an azimuth correlation signal. As is appreciated by those familiar with the art in tracking a non-maneuvering target that is a target which seems to follow a straight path, a more stringent correlation may be employed than the one which need be used when tracking a maneuvering target. The gates 24 may therefore include at least two gates, one hereafter referred to as a non-maneuver gate providing range and azimuth correlation signals $G_R^{NM}$, and $G_\theta^{NM}$, where NM denotes non-maneuver. The two signals may be expressed as $$G_R^{NM} = c\sigma_R k_p \text{ and}$$

$$G_\theta^{NM} = c\sigma_\theta k_p,$$

where $c$ is a constant and $k_p$ is a factor where, $$k_p = \frac{2\alpha^2 + \alpha\beta + 2\beta}{\alpha(4 - 2\alpha - \beta)}^{1/2}$$

The range and azimuth correlation signals of the maneuver gate may be defined as $$G_R^M = c\sigma_R k_p + \frac{a\Delta t^2}{R}$$

and $$G_\theta^M = c\sigma_\theta k_p + \frac{a\Delta t^2/\beta}{R} \frac{180}{\pi}$$

where the postscript $M$ represents a maneuver gate, $c$ is a constant, $a$ is the computed acceleration of the tracked target, and $\beta$ is the velocity smoothing parameter. Most satisfactory results have been obtained with $c$ equal to 3 signal error point.

The track correlator 23 is similar to correlator 43 in that it includes two subtractors in the logic and subtractor 23b (FIG. 3) to provide the range and difference signals such as $\Delta R_n$ and $\Delta\theta_n$ (see FIG. 3) only when these do not exceed the corresponding correlation signals from the gates 24. The correlator 23 operates with the register 23a as explained relative to FIG. 3. If correlation is accomplished only in the maneuver gate, this fact is supplied to the control unit 22 from the track correlator 23 which is used to indicate that the tracked target is maneuvering. The control unit 22 marks a bit in the message unit (FIG. 5) stored in the register and control unit 21a, which information is utilized by the system for smoothing control purposes. The general technique of correlating the incoming plot with each track stored in the track memory 21 in maneuver and non-maneuver gates are similar to the techniques well known in the prior art of track-while-scan radar. Similarly, the operations performed by the tracking logic unit 25 are also known in the prior art. Briefly, the logic unit includes circuitry responsive to the stored tracks and the range and azimuth difference signals to update the target's position and provide a new track representing the predicted target's position. As indicated in an article entitled "Investigation of a Double Integrator, Digital Tracker Used in a Track-While-Scan System" authored by H. Poritsky et al, published on page 45 of the above referred to Proceedings, the tracking process may be defined by the equations $$X_n = X_{P_n} - \alpha(X_{Pn} - X_{mn}) = X_P - \alpha\Delta X_n$$

$$\dot{X}_n = \dot{X}_{n-1} - \beta/\Delta t (X_{Pn} - X_{mn}) = \dot{X}_{n-1} \beta/\Delta t \cdot \Delta X_n$$

$$X_{P_{n+1}} = X_n + \dot{X}_n T,$$

where $X_n$ — smoothed $X$ position coordinate at scan time $n$.
$X_{P_n}$ — predicted $X$ position coordinate at scan time $n$.
$X_{mn}$ — measured $X$ position coordinate at scan time $n$.
$\dot{X}_n$ — $X$ component of velocity at scan time $n$.
$\dot{X}_{n-1}$ — $X$ component of velocity at scan time $n-1$.
$X_{P_{n+1}}$ — predicted $X$ position coordinate for scan time $n+1$.
$\Delta t$ - time between scans providing blips.
$T$ - scan time of the system's sensor, hereafter also designated $T_{scan}$, and $\alpha$ — position smoothing parameter.
$\beta$ — velocity smoothing parameter.

When the blip to scan ratio is 1, $\Delta t = T$.

Similarly, the smoothed Y position coordinate at scan time $n$, i.e., $Y_n$ and the predicted Y position coordinate for scan time $n+1$ are defined by a similar set of equations. It should be appreciated that since in the foregoing description, it has been assumed that unit 25 is supplied with range R and azimuth $\theta$ position signals, these need be converted to X and Y coordinates before the equations can be computed. Also after deriving $X_{P_{n+1}}$ and $Y_{P_{n+1}}$ which are the predicted X and Y coordinates of the target at time $n+1$, these may be converted to the predicted range and azimuth signals $R_{P_{n+1}}$ and $\theta_{P_{n+1}}$ respectively.

In light of the foregoing description, it should be appreciated by those familiar with the art that the operation of the system of the invention may be defined in terms of a sequence of operational instructions of the type generally supplied to a computer to produce the automatic initiation of tracking of a target and a technique to automatically eliminate unwanted plots and initial tracks developed on random clutter or noise.

One example of a sequence of operational instructions is presented hereafter for explanatory purposes, it being appreciated that additional instructions may be included and changes in the sequence introduced without departing from the spirit of the invention. Upon receiving a new plot, the computer operational instructions may include the following instructions:

1. Generate correlation gates for each stored track or plot.
2. Search track main memory by sequentially reading out each track.
3. Correlate each track with the new plot.

4. If correlation with any track is present, select smallest gate correlation.
5. If correlation is not present, generate track initiation gate.
6. Search plot, temporary memory by sequentially reading out each temporary plot stored therein.
7. Correlate each temporary plot with the new plot.
8. If correlation is present, store difference signals in the temporary memory.
9. Transfer correlated temporary plot and difference signals to track logic unit.
10. Generate initial track.
11. Store initial track in track main computer.
12. If correlation is not present, store plot in temporary memory for correlation use on subsequent scan intervals.
13. Repeat processes 1 through 4 for two correlation cycles and make track a system track for display or data link purposes.

Figure 5:
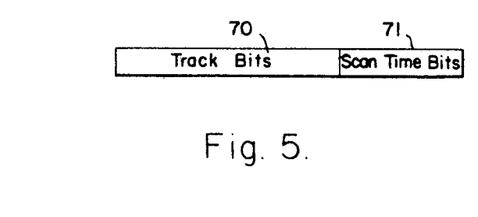
FIG. 5 is a diagram of a single memory address, including scan-time bits, operating as a counter.

As herebefore indicated, before a new track is made into a system track indicating a new target, it has to correlate with plots in two succeeding scans. This is desirable to prevent spurious noise from being interpreted as a target. If the new track does not correlate with the plots in two succeeding scans, it is erased from the track's main memory 21. This may be accomplished by associating each track in memory with scan time units which are used as a counter, which is reset each time the track is updated. On the other hand, if the track does not correlate with a succeeding plot, its counter is incremented. When the count reaches a selected value, such as 2, it indicates that the track did not correlate with the two succeeding plots and therefore it is is erased. FIG. 5 represents a track and its associated counter in one memory address. Numeral 70 represents the track bits, and numeral 71 represents the scan time bits which serve as the counter. It is appreciated that different logic circuitry techniques may be employed to erase the track digits if the track is found not to correlate with two succeeding plots. Similarly, each temporary plot in temporary memory 41 (FIG. 3) may be associated with scan time bits, so that if the temporary plot does not correlate with an input plot during a 2½ scan time interval, it is erased from the temporary memory as herebefore described.

Although, herebefore, it has been assumed that the new plot comprises range R and azimuth θ signals which are correlated with each track in the track main memory 21 or each new plot in the temporary memory 41, the new plot may include other signals, such as signals representing a selective identification feature code, hereafter referred to as SIF code. Also, each track and plot in the memories 21 and 41 may include such signals which are useful in further distinguishing between tracked targets and more closely correlating the new plot to the proper target. Such code signals have been found to be particularly useful in cases where the new plot correlates with tracks of different targets so that the code signals are used to determine with which of the targets the new plot is associated.

In addition, the system may be operated to inhibit the use of the new plot in updating the position of any tracked target if the plot correlates with more than one track and it is not possible to resolve which of the tracks should be updated. This situation may arise when closely spaced targets are tracked and no identification code is provided to distinguish therebetween. Therefore, the new plot is discarded rather than using it in updating the position of a wrong target. These techniques of associating identifying code signals with tracked targets and the problems of distinguishing between closely spaced targets are well known in the radar art as specifically applicable to track-while-scan systems.

There has accordingly been shown and described herein a novel automatic track initiation system for track-while-scan radars. It is appreciated that those familiar with the art may make modifications in the arrangements herebefore specifically described and/or substitute equivalents thereof without departing from the true spirit of the invention. Therefore, all such modifications and/or equivalents are deemed to fall within the scope of the invention as defined in the appended claims.

What is claimed is:

1. In a multi-target track-while-scan radar system including a memory for storing a track representing the predicted position of a target being tracked at a selected time, means for producing a sequence of input plots representing the position of an object, and means for correlating the track in said memory and said input plot, the improvement comprising:

said memory storing said track in range and azimuth parameters;

said means for producing an input plot providing said plots in range and azimuth parameters;

a temporary memory having a predetermined capacity for storing plots;

track initiation gating means for establishing a track initiation correlation criteria;

plot correlating means responsive to the absence of correlation between the track in said memory and each received input plot for serially correlating each received input plot with each plot stored in said temporary memory and providing signals when one of said stored plots correlates with said input plot, said signals being indicative of the position relationship of the two correlated plots;

said plot correlating means also being responsive to the stored plot correlating with said input plot and said signals indicative of the position relationship therebetween for providing an initial target track representing the predicted position of a new target at a selected time; and means for storing said initial target track in said memory for correlation with a succeeding received input plot.

2. In a track-while-scan radar system for tracking a plurality of targets, the system including a video processor for processing video signals to provide input plots each representing the position of an object, a computer memory storing tracks of tracked targets, each track representing the predicted position of one of said targets, track correlator means for correlating said plot and each of said tracks in accordance with at least one selected correlation criteria, said track correlator further including means for providing position relationship signals which are functions of said input plot and the track with which it correlates, and tracking logic means responsive to said position relationship signals and track with which said plots correlated for providing an updated track representing a new predicted position of the target related to said correlated track, an improved system for automatically initiating the tracking of a target comprising:

said video processor providing said plots represented by range signals and azimuth signals and said computer memory storing said track represented by range signals and azimuth signals;

a temporary memory for storing at least one plot;

track initiation gating means for defining an initiation correlation criteria;

a plot correlator for initially correlating said input plot with said at least one plot in accordance with said initiation correlation criteria in the absence of correlation between said input plot and any of the tracks in said computer memory, said plot correlator including means coupled to said temporary memory for causing said input plot to be stored in said temporary memory in the absence of correlation therebetween and said at least one plot, said plot correlator providing signals indicative of the position relationship represented by said input plot and said at least one plot when the two correlate in said plot correlator in accordance with initiation correlation criteria, said tracking logic means being responsive to said signals and said at least one plot which correlates with said input plot for generating an initial track; and means coupling said tracking logic means and said computer memory for storing said initial track therein for correlation with a succeeding received input plot, said initial track representing the predicted position of a new target at a selected time from the time of arrival of said input plot.

3. In the track-while-scan radar system recited in claim 2 further including means for generating said initiation correlation criteria as a function of the radar system's root means square error and the range of a target to be tracked.

4. In the track-while-scan radar system recited in claim 3 further including means in said means for storing for automatically rejecting said initial target rack when said track does not correlate with any of the plots received during a predetermined time interval.

5. In the track-while-scan radar system recited in claim 4 wherein said predetermined time interval is greater than 2 times the scan time.

6. In the track-while-scan radar system recited in claim 4 further including means in said temporary memory for erasing said stored plot from said memory when said stored plot does not correlate with an input plot during a predetermined time interval.

7. In the track-while-scan radar system recited in claim 6 wherein said time interval is greater than 2 times the scan time.

8. In the track-while-scan radar system recited in claim 3 wherein said plot correlator correlates the range signals of said input plot with the range signals of each plot stored in said temporary memory and provides a range difference signal when the difference between the range signals is not greater than a preselected range defined by said initiation correlation criteria, said plot correlator further correlates the azimuth signals of said input plot with the azimuth signals of each plot in said temporary memory to provide an azimuth difference signal when the difference between the azimuth signals is not greater than an azimuth value defined by said initiation correlation criteria, the range and azimuth difference signals from said plot correlator comprising the position relationship signals thereof.

9. In the track-while-scan radar system recited in claim 8 wherein said track initiation gating means includes means for providing the range and azimuth values defined by said initiation criteria as a function of the range and azimuth system's root mean square errors respectively.

10. In the track-while-scan radar system recited in claim 2 wherein the range R signals and azimuth $\theta$ signals of each track and plot defining the position of a target with respect to a reference point and reference line respectively and wherein said track correlator includes means for correlating the range signals of said input plot with the range signals of each track in said computer memory for providing a range difference signal when the difference between the range signals is not greater than a preselected range value defined by said selected correlation criteria, said track correlator also being operative to correlate the azimuth signals of said input plot with the azimuth signals of each track in said computer memory, to provide an azimuth difference signal when the difference between the azimuth signals is not greater than an azimuth value defined by said selected correlation criteria, said range and azimuth difference signals comprising said position relationship signals provided by said track correlator.

* * * * *